United States Patent
Shiomi et al.

(10) Patent No.: US 8,433,492 B2
(45) Date of Patent: Apr. 30, 2013

(54) ACCELERATOR-PEDAL REACTION FORCE CONTROL APPARATUS

(75) Inventors: Masao Shiomi, Sagamihara (JP); Shigeyuki Sakaguchi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 285 days.

(21) Appl. No.: 12/999,413

(22) PCT Filed: Jul. 31, 2009

(86) PCT No.: PCT/IB2009/006436
§ 371 (c)(1),
(2), (4) Date: Dec. 16, 2010

(87) PCT Pub. No.: WO2010/133915
PCT Pub. Date: Nov. 25, 2010

(65) Prior Publication Data
US 2011/0087414 A1     Apr. 14, 2011

(30) Foreign Application Priority Data

Jul. 31, 2008 (JP) ................................. 2008-197386
May 21, 2009 (JP) ................................. 2009-123001

(51) Int. Cl.
*G06F 7/70* (2006.01)

(52) U.S. Cl.
USPC .............................. 701/70; 477/120; 180/170

(58) Field of Classification Search .................... 701/52, 701/70, 93, 301; 340/435, 436, 903; 477/120, 477/97; 180/170
See application file for complete search history.

(56) References Cited

U.S. PATENT DOCUMENTS

| | | | |
|---|---|---|---|
| 5,287,773 A * | 2/1994 | Nakawaki et al. | 477/92 |
| 5,784,883 A * | 7/1998 | Ohkura et al. | 60/327 |
| 6,157,885 A * | 12/2000 | Sakaguchi et al. | 701/54 |
| 6,799,110 B2 * | 9/2004 | Hashimoto et al. | 701/62 |
| 7,022,045 B2 * | 4/2006 | Yone | 477/120 |
| 7,734,419 B2 * | 6/2010 | Kondoh | 701/301 |
| 2003/0100975 A1 * | 5/2003 | Hashimoto et al. | 701/1 |
| 2003/0135317 A1 | 7/2003 | Hijikata et al. | |
| 2004/0028970 A1 * | 2/2004 | Sakai et al. | 429/24 |
| 2004/0059482 A1 | 3/2004 | Hijikata | |
| 2007/0106475 A1 * | 5/2007 | Kondoh | 701/301 |
| 2008/0134830 A1 * | 6/2008 | Park | 74/514 |

FOREIGN PATENT DOCUMENTS

| | | |
|---|---|---|
| CN | 1986306 A | 6/2007 |
| JP | 3-217627 A | 9/1991 |
| JP | 4-121432 A | 4/1992 |
| JP | 5-231194 A | 9/1993 |

(Continued)

OTHER PUBLICATIONS

International Search Report from PCT/IB2009/006436 dated Oct. 27, 2009 (2 pages).
International Preliminary Report on Patentability in PCT Application PCT/IB2009/006436, dated Feb. 10, 2011 (6 pages).

(Continued)

*Primary Examiner* — Thomas Black
*Assistant Examiner* — Shardul Patel
(74) *Attorney, Agent, or Firm* — Osha Liang LLP

(57) ABSTRACT

A utility vehicle comprising a cab which houses a steering wheel assembly is provided wherein a steering wheel (22) is rotatably mounted to a support body (24). The support body, or steering console, is mounted on an armrest assembly (40) or control console positioned to one side of a driver's seat (18). By providing an asymmetric mounting arrangement for the steering console, the space underneath is left clear of any supporting structure thus providing improved legroom for the driver.

25 Claims, 9 Drawing Sheets

FOREIGN PATENT DOCUMENTS

| | | | |
|---|---|---|---|
| JP | 9-249043 | A | 9/1997 |
| JP | 10-166890 | A | 6/1998 |
| JP | 2001-082184 | A | 3/2001 |
| JP | 2003120339 | A | 4/2003 |
| JP | 2003-219230 | A | 7/2003 |
| JP | 2003-291682 | A | 10/2003 |
| JP | 2004-314871 | A | 11/2004 |
| JP | 2005-132225 | A | 5/2005 |
| JP | 2007-076468 | A | 3/2007 |
| JP | 2007-126038 | A | 5/2007 |

OTHER PUBLICATIONS

Extended European search report for European Application No. 09844844.2 dated Dec. 21, 2012 (4 pages).

European Patent Abstract for Japanese Publication No. 2003120339 published Apr. 23, 2003 (1 page).

Chinese Office Action issued in Chinese Application No. 200980127275.9, dated Jan. 4, 2013 (5 pages).

\* cited by examiner

ACCELERATOR-PEDAL REACTION FORCE CONTROL APPARATUS

CROSS-REFERENCE TO RELATED APPLICATIONS

The present application claims priority from Japanese Patent Application No. 2008-197386, filed Jul. 31, 2008 and Japanese Patent Application No. 2009-123001, filed May 21, 2009, the contents of which are both hereby incorporated by reference in their entirety.

BACKGROUND OF THE DISCLOSURE

1. Field of the Disclosure

The present disclosure relates to an accelerator-pedal reaction force control apparatus which controls a reaction force of an accelerator pedal of a vehicle.

2. Description of the Related Art

Japanese Unexamined Patent Application Publication No. 2003-120339 (hereinafter referred to as Patent Document 1) discloses a technique for increasing a reaction force against depression (hereinafter also referred to simply as reaction force) of an accelerator pedal. This technique is applied to an engine which switches between a first operation method (for example, homogeneous combustion) for a high-rotational-speed, high-load operation and a second operation method (for example, stratified combustion) for a low-rotational-speed, low-load operation in which fuel efficiency is higher than that in the first operation method. According to this technique, in a process of switching an engine operation from a second operating range in which the second operation method is used to a first operating range in which the first operation method is used, the reaction force is suddenly increased at the time when the engine operation enters a boundary operating range immediately before entering the first operating range. The amount of increase in the reaction force is eliminated when the engine operation returns to the second operating range from the boundary operating range.

According to the technique of Patent Document 1, the reaction force of the accelerator pedal is increased or the amount of increase therein is eliminated in the boundary operating range for the purpose of reducing the specific fuel consumption. However, the accelerator pedal is a main operating member operated by the driver to drive the vehicle in a way that the driver desires. Therefore, the operational feel of the accelerator pedal and the influence thereof on the vehicle driving performance directly affect the overall quality evaluation made by the driver. For this reason, this type of reaction-force control apparatus which contributes to the reduction in fuel consumption cannot be put into practical use unless the reduction in fuel consumption can be achieved together with satisfactory operational feel of the accelerator pedal and operability of the vehicle.

Various tests have been performed for putting the reaction-force control apparatus which contributes to the reduction in fuel consumption into practical use. As a result of these tests, it was found that if the reaction force is increased or the increase therein is eliminated at a certain accelerator opening degree which corresponds to a boundary as described in Patent Document 1, unfavorable operational behavior finally occurs as a result of an unintentional response by a driver.

More specifically, according to the technique described in Patent Document 1, when the driver depresses the accelerator pedal and the operating range is changed from the second operating range to the boundary operating range, the reaction force suddenly increases. Therefore, there is a possibility that the accelerator pedal will be pushed back against the intention of the driver and the operating range will return to the second operating range from the boundary operating range. In such a case, the reaction force, which has been suddenly increased when the operating range has been changed from the second operating range to the boundary operating range, will be suddenly reduced. Since the original intention of the driver was to depress the accelerator pedal and the depression of the accelerator pedal caused the increase in the reaction force, the driver tends to depress the accelerator pedal again when the operating range is changed from the boundary operating range and the reaction force is reduced. As a result, the operating range changes from the second operating range to the boundary operating range again, and the reaction force suddenly increases accordingly. Consequently, the accelerator pedal will once again be pushed back against the intention of the driver.

Thus, when the driver increases the accelerator opening degree such that the fuel efficiency of the vehicle changes beyond a certain boundary, there is a risk that the accelerator pedal will unstably move up and down against the intention of the driver. This makes the user feel uncomfortable and degrades the operability of the vehicle.

SUMMARY OF THE CLAIMED SUBJECT MATTER

In one aspect, the present disclosure relates to an accelerator reaction force control apparatus for a vehicle including a means for detecting a position of an accelerator, a means for changing a reaction force of the accelerator, and a controller configured to control the reaction force changing means, wherein the controller sets a first position threshold of the accelerator associated with an operating state of the vehicle, the controller controls the reaction-force changing means to add an increase to the reaction force of the accelerator when the accelerator position exceeds the first position threshold, the controller sets an second position threshold of the accelerator smaller than the first position threshold, and the controller controls the reaction force changing means to eliminate the increase in the reaction force of the accelerator when the accelerator position is reduced to equal to or less than the second position threshold.

In another aspect, the present disclosure relates to an accelerator apparatus including an accelerator position sensor and a reaction force controller to adjust a reaction force of an accelerator, wherein the reaction force controller comprises a first position threshold based on an operating state and a second position threshold that is less than the first position threshold, wherein the reaction force controller is configured to increase the reaction force when the accelerator passes the first position threshold and to reduce the reaction force when the accelerator is reduced to a position below the second position threshold from a position above the first position threshold.

In another aspect, the present disclosure relates to a method to control a reaction force of an accelerator of a vehicle including detecting a position of the accelerator, setting a first position threshold of the accelerator based upon an operating state of the vehicle, setting an second position threshold of the accelerator below the first position threshold, increasing a reaction force of the accelerator when the accelerator position exceeds the first position threshold, and reducing the increased reaction force of the accelerator when the accelerator position is reduced from a position in excess of the first position threshold to a position equal to or less than the second position threshold.

BRIEF DESCRIPTION OF DRAWINGS

Features of the present disclosure will become more apparent from the following description in conjunction with the accompanying drawings.

FIGS. 4A and 4B illustrate an embodiment based on a lock-up clutch, wherein FIG. 4A is a characteristic diagram showing the accelerator-pedal reaction force versus the accelerator opening degree and FIG. 4B is a characteristic diagram showing a lock-up area.

FIGS. 5A and 5B illustrate an embodiment based on a fuel-increasing area, wherein FIG. 5A is a characteristic diagram showing the accelerator-pedal reaction force versus the accelerator opening degree and FIG. 5B is a characteristic diagram showing the fuel-increasing area.

FIGS. 6A and 6B illustrate an embodiment based on a fuel characteristic of an engine, wherein FIG. 6A is a characteristic diagram showing the accelerator-pedal reaction force the accelerator opening degree and FIG. 6B is a characteristic diagram showing equivalent fuel efficiency curves.

FIGS. 7A and 7B illustrate an embodiment based on a down-shifting operation of an automatic transmission, wherein FIG. 7A is a characteristic diagram showing the accelerator-pedal reaction force versus the accelerator opening degree and FIG. 7B is a graph showing speed-changing operations of the automatic transmission.

DETAILED DESCRIPTION

Embodiments of the present disclosure will be described in detail below with reference to the drawings.

Figure 1:
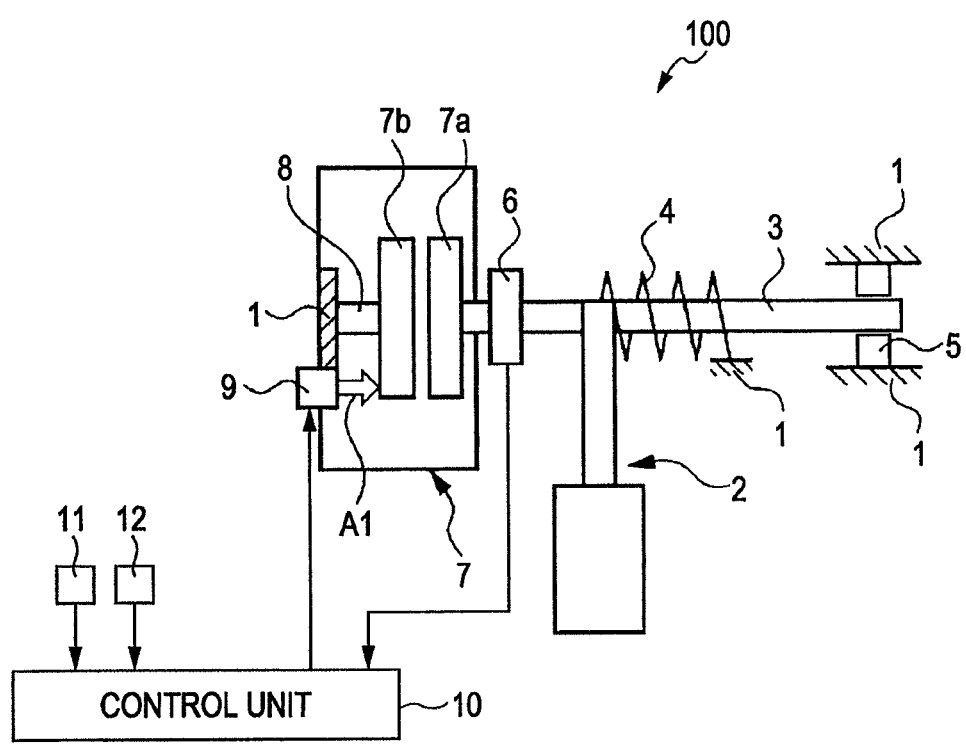
FIG. 1 is a schematic diagram illustrating the system structure of an accelerator-pedal reaction force control apparatus in accordance with embodiments of the present disclosure together with a reaction-force changing mechanism.

FIG. 1 is a schematic diagram illustrating the system structure of an accelerator-pedal reaction force control apparatus 100. The accelerator-pedal reaction force control apparatus 100 may control a reaction force (operational reaction force) of an accelerator pedal 2 provided in a vehicle body 1 of a vehicle (not shown). While the term "accelerator pedal" or "accelerator" is used throughout this specification, it should be understood that such terms should not be limited to any particular embodiment or style of input device. In particular, while a "pedal" inside the passenger compartment is described, it should be understood that the "accelerator" may be a device in the engine compartment responsive to electrical, hydraulic, or mechanical signals produced by a pedal (or other device) in the passenger compartment. Additionally, while the device in the passenger compartment is described as a pedal, it should be understood that various other regulating devices (e.g., levers, switches, buttons, etc) may be used as "accelerators" or as devices that signal an "accelerator." As described below, the accelerator-pedal reaction force control apparatus 100 may include a means for detecting an opening degree (amount of depression) of the accelerator pedal 2 provided in the vehicle, and a means for changing the reaction force of the accelerator pedal 2 from a basic reaction force. The basic reaction force may be an operational reaction force set relative to an amount of depression of the accelerator pedal, such as a well-known accelerator pedal. Furthermore, the basic reaction force may be set to be increased depending on the increase of the amount of depression of the accelerator pedal approximately proportionally. When the opening degree of the accelerator pedal 2 may exceed a predetermined accelerator-opening-degree threshold, the reaction force of the accelerator pedal 2 may be increased from the basic reaction force. The increased amount added to the reaction force, that is the difference between the amount of an increased reaction force and the basic reaction force at the same depression of the accelerator pedal, may be an increase of the reaction force by the accelerator-pedal reaction force control apparatus.

Figure 2:
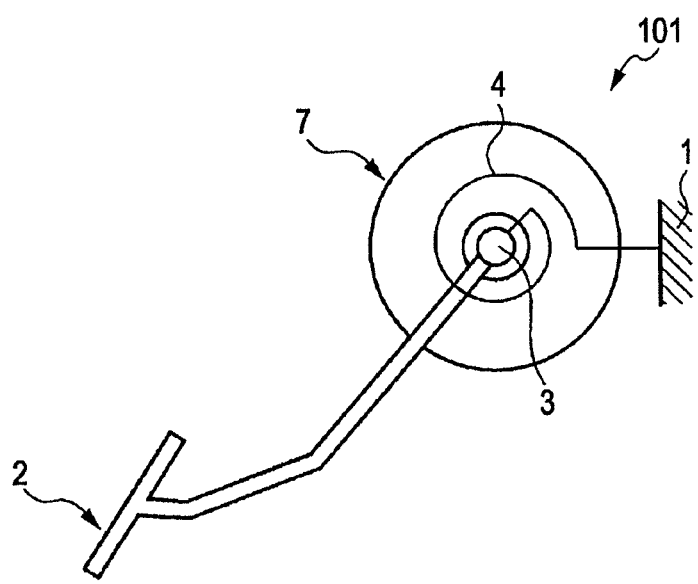
FIG. 2 is a schematic diagram illustrating an example of a reaction-force changing mechanism in accordance with embodiments of the present disclosure.

FIG. 2 is a diagram illustrating an example of a reaction-force changing mechanism 101. As shown in FIGS. 1 and 2, the accelerator pedal 2 may be provided on a rotating shaft 3 such that the accelerator pedal 2 may pivot about the rotating shaft 3. The accelerator pedal 2 may receive a reaction force in a closing direction thereof from a return spring 4 which may be fixed to the vehicle body 1 at one end thereof and to the rotating shaft 3 at the other end thereof. Various types of springs may be used as the return spring 4. The rotating shaft 3 may be rotatably supported by a bearing 5 provided on the vehicle body 1 at one end thereof. An accelerator stroke sensor 6, which may serve as the accelerator-opening-degree detecting means and outputs an accelerator-opening-degree signal APS (the accelerator-opening-degree is an amount of depression of the accelerator pedal), may be provided near the other end of the rotating shaft 3. In addition, an engine rotational speed sensor 11, which detects an engine rotational speed Ne, and a vehicle speed sensor 12, which detects a vehicle speed VSP, may be provided.

In an exemplary embodiment, the amount of depression of the accelerator pedal 2 (i.e., the accelerator opening degree or angle) may be associated with an opening degree of a throttle valve (not shown) of an engine (not shown) so that the throttle valve opening of the engine increases in accordance with the amount of depression of the accelerator pedal 2. Thus, the amount of fuel injection (amount of fuel consumption) increases in accordance with the accelerator opening degree.

The reaction-force changing mechanism 101 may include a variable friction plate 7 which may include a pair of friction members 7a and 7b which face each other and which may apply a frictional force against the rotation of the rotating shaft 3. One friction member 7a may be mechanically fixed to an end portion of the rotating shaft 3, and the other friction member 7b may be supported by a fixed shaft 8 with a spline or the like provided therebetween so that the friction member 7b may be movable in an axial direction but is not rotatable. The fixed shaft 8 may be fixed to and supported by the vehicle body 1. An actuator (for example, an electromagnetic solenoid) 9 which is capable of urging the friction member 7b against the friction member 7a may be fixed to the vehicle body 1.

In the variable friction plate 7, the actuator 9 may operate to move the friction member 7b in the axial direction (direction shown by the arrow A1 in FIG. 1), and thereby changes the frictional force applied between the friction member 7a and the friction member 7b. The operation of the actuator 9 may be controlled by a control unit 10. Therefore, the control unit 10 may be capable of controlling the operation of the actuator 9 so as to change the reaction force of the accelerator pedal 2 against the depression thereof by changing the frictional force applied to the rotating shaft 3.

Figure 3:
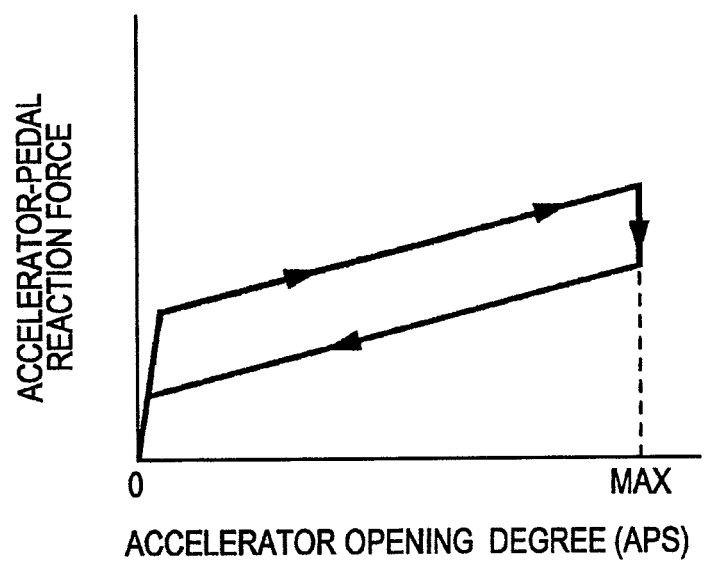
FIG. 3 is a characteristic diagram showing the characteristic of the basic reaction force of the accelerator pedal in accordance with embodiments of the present disclosure.

FIG. 3 schematically shows the characteristic of the accelerator-pedal reaction force according to an exemplary embodiment. The basic reaction force substantially changes in proportion to the accelerator opening degree with a suitable hysteresis depending on whether the accelerator pedal is operated in an opening-degree-increasing direction or in an opening-degree-reducing direction.

The control unit 10 may set an accelerator-opening-degree threshold associated with a specific fuel consumption on the basis of the operational state of the vehicle or the engine. The control unit 10 may also set an increase-elimination threshold to an accelerator opening degree that may be smaller than the accelerator-opening-degree threshold by a predetermined amount. The control unit 10 may increase the reaction force of the accelerator pedal by a predetermined amount when the accelerator opening degree exceeds the above-mentioned accelerator-opening-degree threshold, and may eliminate the amount of increase in the reaction force of the accelerator pedal when the accelerator opening degree is reduced to the increase-elimination threshold.

For illustrative purposes only, an exemplary embodiment in which the accelerator-opening-degree threshold is set in accordance with the state of engagement or disengagement of a lock-up clutch in an automatic transmission including a torque converter will be described with reference to FIGS. 4A and 4B. As is well known, the lock-up clutch is a mechanism for directly connecting an input and an output of the torque converter to each other. As shown in the characteristic diagram of FIG. 4B, the lock-up clutch may be switched between an engaged state and a disengaged state in accordance with the vehicle speed VSP and the accelerator opening degree APS. The lock-up clutch may be set to the disengaged state in a non lock-up (Non L/U) area (shaded area in FIG. 4B) in which the vehicle speed VSP is low and the accelerator opening degree APS is large, and may be set to the engaged state in a lock-up (L/U) area in which the vehicle speed VSP is high and the accelerator opening degree APS is small. In the state in which the lock-up clutch is disengaged, the specific fuel consumption is higher than that in the state in which the lock-up clutch is engaged. Therefore, in the present illustrative embodiment, the non lock-up area may be considered to correspond to an operating range with a high specific fuel consumption, and the lock-up area may be considered to correspond to an operating range with a low specific fuel consumption. When the accelerator opening degree APS is increased such that the state of the lock-up clutch changes from the lock-up area to the non lock-up area, the accelerator-pedal reaction force may be increased.

Figure 4A:
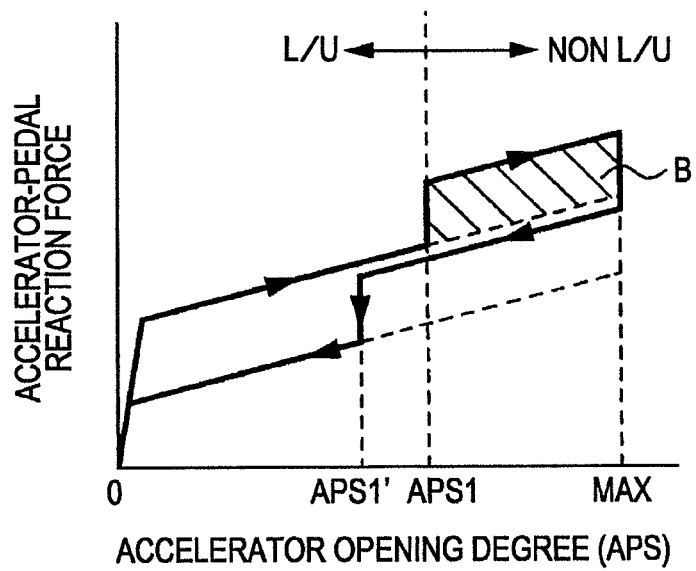

FIG. 4A shows the characteristic of the accelerator-pedal reaction force according to the present illustrative embodiment. The control unit 10 refers to the characteristic diagram shown in FIG. 4B and may determine whether the lock-up clutch is in the disengaged state (Non L/U area) or the engaged state (L/U area) on the basis of the vehicle speed VSP and the accelerator opening degree APS. In the case where the lock-up clutch is in the engaged state (L/U area), an accelerator-opening-degree threshold for increasing the reaction force may be set to the accelerator opening degree APS corresponding to the vehicle speed VSP input from the vehicle speed sensor on the boundary line L1 between the L/U area and the Non L/U area shown in FIG. 4B. As shown in FIG. 4B, when, for example, the vehicle speed is VSP1, the corresponding accelerator opening degree APS1 is set as the accelerator-opening-degree threshold for increasing the reaction force of the accelerator pedal 2. In addition, the control unit 10 may set an increase-elimination threshold APS1' to an accelerator opening degree that is smaller than the accelerator-opening-degree threshold APS1 by a predetermined amount. The increase-elimination threshold APS1' may be a threshold of the accelerator opening degree at which the amount by which the reaction force is increased at the accelerator-opening-degree threshold APS1 is eliminated, that is, reduced. When the accelerator opening degree is reduced and becomes equal to or less than the increase-elimination threshold APS1', the amount of increase in the reaction force may be eliminated. The increase-elimination threshold APS1' may be set by subtracting a predetermined amount of opening from the accelerator-opening-degree threshold APS1 or by multiplying the accelerator-opening-degree threshold APS1 by a predetermined coefficient. However, the method for setting the increase-elimination threshold APS1' is not limited to this.

When the accelerator opening degree APS detected by the accelerator stroke sensor 6 is increased and exceeds the accelerator-opening-degree threshold APS1, the control unit 10 may output a command signal to the actuator 9 and may cause the actuator 9 to increase the reaction force applied by the variable friction plate 7 stepwise. Thus, an amount of increase in the reaction force denoted by B in FIG. 4A is added to the basic reaction force. This corresponds to the switching point between the engaged state and the disengaged state of the lock-up clutch, as described above. The amount of increase B in the reaction force may be continuously added to the basic reaction force within the range of accelerator opening degree up to the maximum accelerator opening degree.

When the accelerator-pedal reaction force is increased stepwise at the accelerator-opening-degree threshold APS1 which corresponds to disengaging of the lock-up clutch, the driver may feel that the force required to depress the accelerator pedal 2 has been increased. Therefore, excessive depression of the accelerator pedal 2 by the driver may be suppressed and the driver may be informed that the driving state has been changed to a state in which the specific fuel consumption is high (fuel efficiency is low). The accelerator opening degree APS at which the state of the lock-up clutch changes from the engaged state to the disengaged state may not be constant, but may vary in accordance with the vehicle speed VSP. Even though the accelerator opening degree APS at which the state of the lock-up clutch changes to the disengaged state varies, the reaction force of the accelerator pedal 2 may be changed (the force required to depress the accelerator pedal 2 is increased) in accordance with the accelerator opening degree APS that varies. Therefore, the driver may be accurately informed that the operating range has been switched from a range with a relatively low specific fuel consumption to a range with a relatively high specific fuel consumption.

Then, when the accelerator pedal 2 is returned, that is, when the accelerator opening degree is reduced, the amount of increase B in the reaction force may be continuously added to the basic reaction force (the basic reaction force for the accelerator-opening-degree reducing direction having a hysteresis with respect to the basic reaction force in the accelerator-opening-degree increasing direction (see FIG. 3)) while the accelerator opening degree is higher than the accelerator-opening-degree threshold APS1, as shown in FIG. 4A. The addition of the amount of increase B in the reaction force may be continued until the accelerator opening degree is reduced to the increase-elimination threshold APS1'. Then, when the accelerator opening degree APS becomes equal to or less than the increase-elimination threshold APS1', the amount of increase B in the reaction force may be eliminated and the accelerator-pedal reaction force returns to the basic reaction force shown in FIG. 3.

Figure 5A:
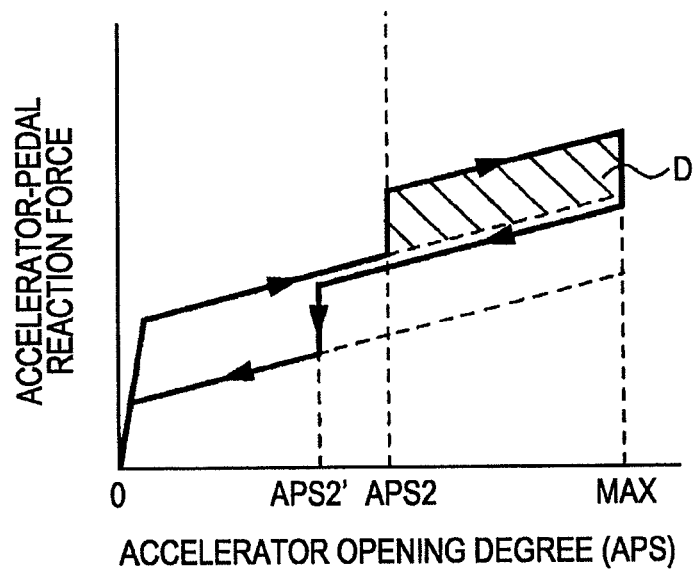
Figure 5B:
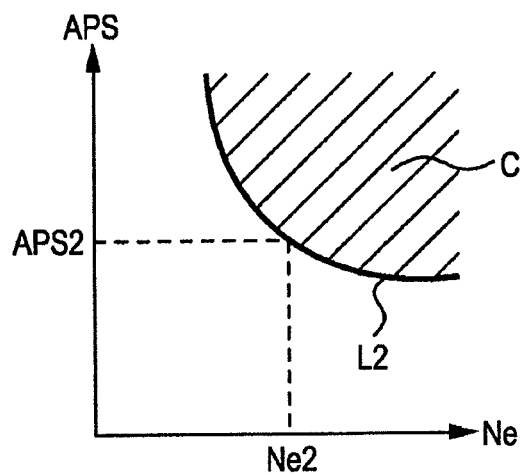

FIGS. 5A and 5B show an exemplary embodiment in which the accelerator-opening-degree threshold is set in accordance with a fuel-increasing area at a high-load side of the engine.

FIG. 5A shows the characteristic of the reaction force of the accelerator pedal 2 with respect to the accelerator opening degree APS. FIG. 5B shows the fuel-increasing area (shaded area C) which may be determined on the basis of the accelerator opening degree APS and the engine rotational speed Ne. The fuel-increasing area C is generated due to switching of the setting of the air-fuel ratio or switching of the combustion method (for example, switching between stratified combustion and homogeneous combustion). As shown in FIG. 5B, the fuel-increasing area C may be at an area where the accelerator opening degree APS is large and the engine rotational speed Ne is high. Therefore, an accelerator opening degree corresponding to the current engine rotational speed Ne (for example, Ne2) on the boundary line L2 shown in FIG. 5B may be set as an accelerator-opening-degree threshold APS2. When the accelerator opening degree APS exceeds the accelerator-opening-degree threshold APS2, an amount of increase D in the reaction force may be added to the basic reaction force. In addition, similar to the above-described embodiment, an increase-elimination threshold APS2' for eliminating the amount of increase D in the reaction force may be set. In the process of returning the accelerator pedal 2, the reaction force returns to the basic reaction force when the accelerator opening degree is reduced to the increase-elimination threshold APS2'.

The accelerator-pedal reaction force may be controlled as shown in FIG. 5A. Accordingly, the force required to depress the accelerator pedal 2 may be increased when the operational state of the engine enters the fuel-increasing area. Therefore, the driver may be accurately informed that the operational state of the engine has been changed from that in a range with a relatively low specific fuel consumption to that in a range with a relatively high specific fuel consumption. Therefore, unintentional depression of the accelerator pedal 2 by the driver in the range with high specific fuel consumption may be suppressed and the fuel efficiency may be increased.

Figure 6A:
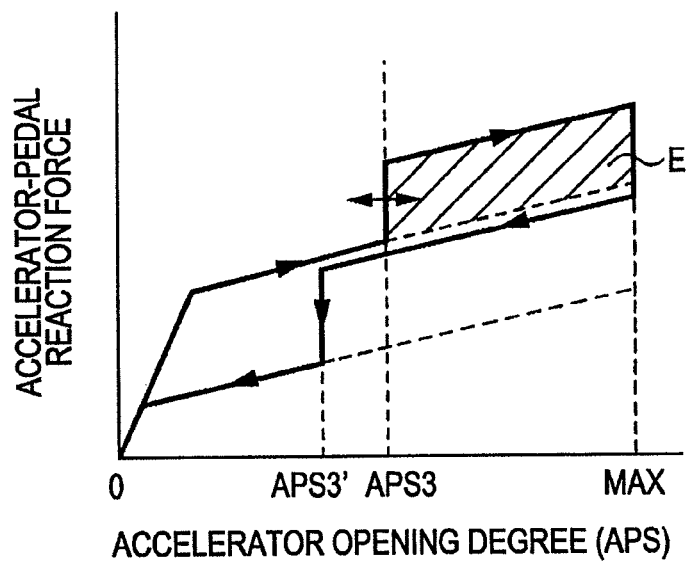
Figure 6B:
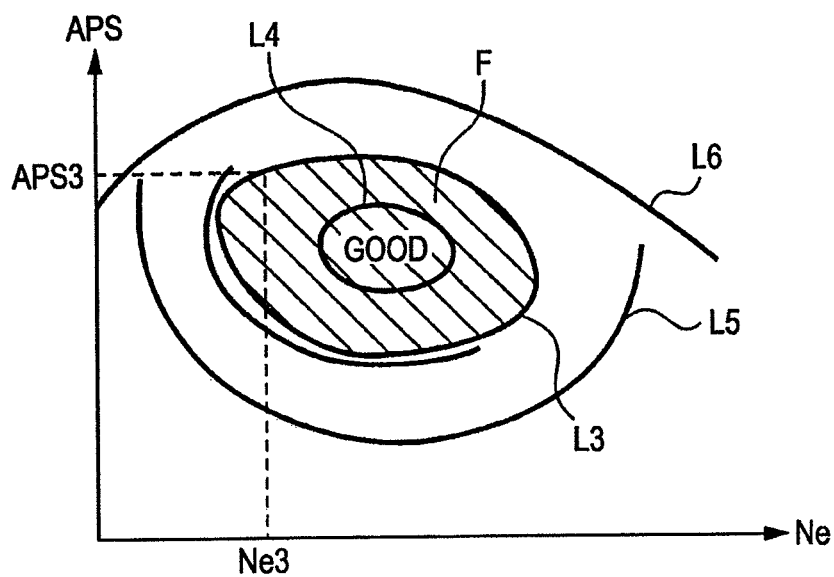

FIGS. 6A and 6B show an exemplary embodiment in which the accelerator-opening-degree threshold is set in accordance with the characteristic of fuel efficiency of the engine.

FIG. 6A shows the characteristic of the reaction force of the accelerator pedal 2 with respect to the accelerator opening degree APS. FIG. 6B shows equivalent fuel efficiency curves L3 to L6, on which the specific fuel consumption is constant, with respect to the accelerator opening APS and the engine rotational speed Ne. As is clear from the equivalent fuel efficiency curves L3 to L6, in this example, the fuel efficiency is at a maximum in a middle-speed, middle-load area. The shaded area F may be considered to be a high-fuel-efficiency area, and a boundary line of the shaded area F on the high-load side, that is, on the side at which the accelerator opening degree is large, may be set as a boundary line between the high-fuel-efficiency area and a low-fuel-efficiency area. Therefore, an accelerator opening degree corresponding to the current engine rotational speed Ne (for example, Ne3) on the boundary line may be set as an accelerator-opening-degree threshold APS3.

As shown in FIG. 6A, when the accelerator opening degree APS exceeds the accelerator-opening-degree threshold APS3, an amount of increase E in the reaction force may be added to the basic reaction force. In addition, similar to the above-described embodiments, an increase-elimination threshold APS3' for eliminating the amount of increase E in the reaction force may be set. In the process of returning the accelerator pedal 2, the reaction force returns to the basic reaction force when the accelerator opening degree is reduced to the increase-elimination threshold APS3'.

Because the accelerator-pedal reaction force may be controlled as described above, the force required to depress the accelerator pedal 2 may be increased when the operational state of the engine is out of the high-fuel-efficiency area F. Therefore, the driver may be accurately informed that the operational state of the engine has been changed from that in a range with a relatively low specific fuel consumption to that in a range with a relatively high specific fuel consumption. Therefore, unintentional depression of the accelerator pedal 2 by the driver in the range with high specific fuel consumption may be suppressed and the fuel efficiency may be increased.

Figure 7A:
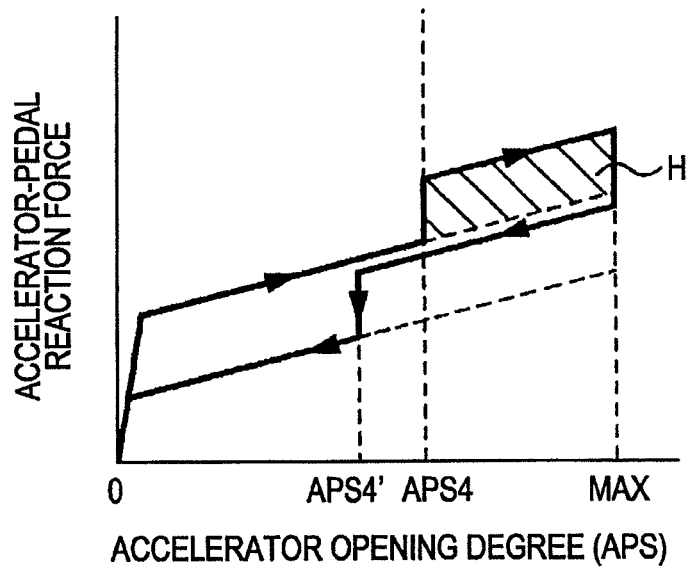
Figure 7B:
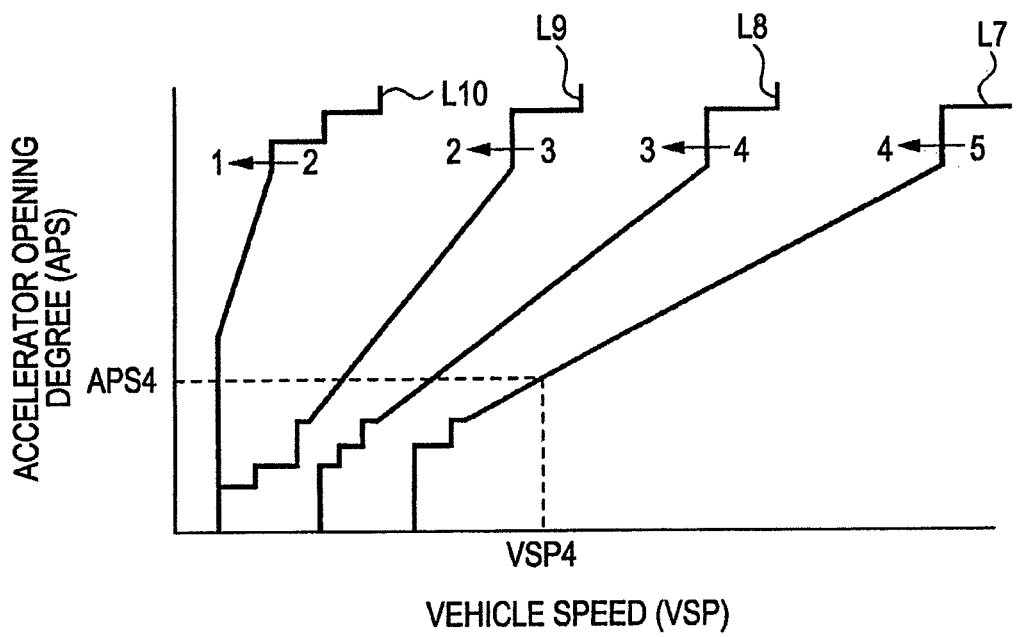

FIGS. 7A and 7B show an exemplary embodiment in which the accelerator-opening-degree threshold is set in accordance with down-shifting (automatic shifting to a lower-speed range) of the automatic transmission.

FIG. 7A shows the characteristic of the reaction force of the accelerator pedal 2 with respect to the accelerator opening degree APS. FIG. 7B is a graph illustrating the speed-changing operation performed by, for example, a five-speed automatic transmission. As shown in FIG. 7B, speed-changing control operations may be performed on the basis of the vehicle speed VSP and the accelerator opening degree APS. In general, the specific fuel consumption at a high-speed range is lower than that at a low-speed range. Here, it is assumed that a speed-changing line L7 for downshifting from the fifth speed to the fourth speed functions as the boundary line between the range with a relatively low specific fuel consumption and the range with a relatively high specific fuel consumption. Therefore, an accelerator opening degree corresponding to the current vehicle speed VSP (for example, VSP4) on the boundary line L7 may be set as an accelerator-opening-degree threshold APS4. Here, the accelerator-opening-degree threshold may also be set on the basis of other speed-changing lines L8 to L10 for changing between other speeds.

As shown in FIG. 7A, when the accelerator opening degree APS exceeds the accelerator-opening-degree threshold APS4, an amount of increase H in the reaction force may be added to the basic reaction force. In addition, similar to the above-described embodiments, an increase-elimination threshold APS4' for eliminating the amount of increase H in the reaction force may be set. In the process of returning the accelerator pedal 2, the reaction force may return to the basic reaction force when the accelerator opening degree is reduced to the increase-elimination threshold APS4'.

Because the accelerator-pedal reaction force may be controlled as described above, the force required to depress the accelerator pedal 2 may be increased when the operation of shifting to a low-speed range, at which the specific fuel consumption is relatively high, may be performed by the automatic transmission.

In the above-described embodiments, the reaction force of the accelerator pedal 2 may be increased at the time when the operation changes from the range with a relatively low specific fuel consumption to the range with a relatively high specific fuel consumption. However, the reaction force may also be increased immediately before the operation actually enters the range with a relatively high specific fuel consumption (that is, while the accelerator opening degree is slightly smaller than that at the boundary corresponding to the switching point). In such a case, prediction that the fuel efficiency will be reduced may be presented to the driver in advance. Accordingly, the driver may be informed that the fuel efficiency may be expected to be reduced, and can intentionally avoid the situation that the operation enters the range with a high specific fuel consumption. Therefore, the fuel efficiency may be further improved.

The difference in operation between the above-described technique and the present disclosure will now be described.

According to the above-described known technique, the accelerator-pedal reaction force may be increased from the basic reaction force when the accelerator opening degree reaches a predetermined accelerator opening degree (reaction-force-increasing accelerator opening degree), and the amount of increase in the reaction force may be reduced when the accelerator opening degree becomes smaller than the reaction-force-increasing accelerator opening degree. In such a case, there may be a problem that the accelerator pedal 2 will unstably move up and down against the intention of the driver.

Figure 8:
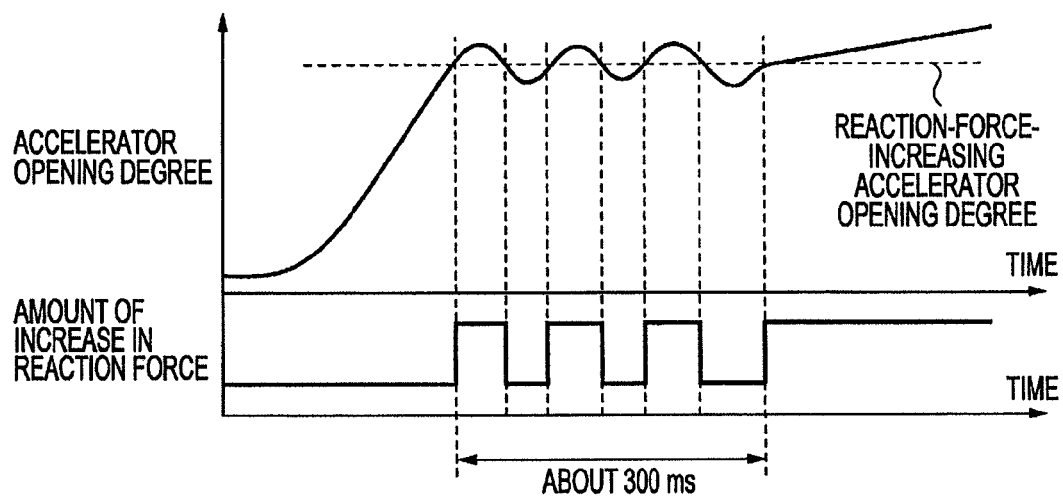
FIG. 8 is a time chart showing the variation with time in the accelerator opening degree and the increase in the accelerator-pedal reaction force according to a comparative example.
Figure 9:
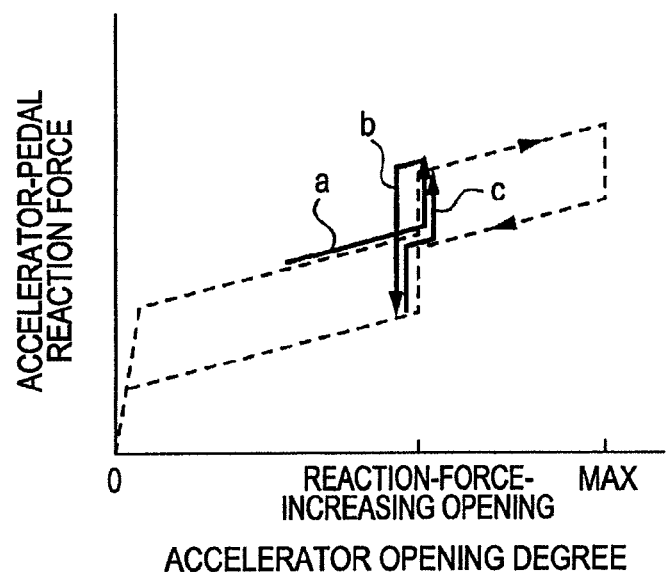
FIG. 9 is a characteristic diagram showing the variation in the accelerator-pedal reaction force according to the comparative example using the accelerator opening degree and the accelerator-pedal reaction force as parameters.

FIG. 8 is a time chart illustrating the operation according to the known technique, and FIG. 9 is a graph illustrating the operation by the arrows using the accelerator-pedal reaction force and the accelerator opening degree as parameters. In FIG. 9, the dashed lines show the characteristic of the accelerator-pedal reaction force with respect to the accelerator opening degree according to the known technique.

In the process of depressing the accelerator pedal and increasing the accelerator opening degree, when the accelerator opening degree exceeds a predetermined reaction-force-increasing accelerator opening degree, the accelerator-pedal reaction force is increased stepwise from the basic reaction force, as shown by the arrow a in FIG. 9.

When the accelerator-pedal reaction force is suddenly increased as described above, the accelerator pedal may be pushed back due to a rebound caused by the sudden increase in the accelerator-pedal reaction force. Accordingly, the accelerator opening degree becomes equal to or less than the reaction-force-increasing accelerator opening degree, and the amount of increase in the reaction force is eliminated. Therefore, as shown by the arrow b in FIG. 9, the accelerator-pedal reaction force may be immediately reduced to the basic reaction force for the accelerator-pedal returning direction (accelerator-opening-degree reducing direction).

Here, the original intention of the driver was to increase the accelerator opening degree, and the accelerator opening degree exceeded the reaction-force-increasing accelerator opening degree as a result of the operation of increasing the accelerator opening degree. Therefore, the driver may further depress the accelerator pedal 2 after the accelerator opening degree is reduced and becomes equal to or less than the reaction-force-increasing accelerator opening degree. In such a case, the accelerator opening degree will exceed the reaction-force-increasing accelerator opening degree again and the reaction force may be increased stepwise again, as shown by the arrow c in FIG. 9.

Then, when the accelerator-pedal reaction force is largely increased, the accelerator pedal may be pushed back again and the accelerator opening degree will become equal to or less than the reaction-force-increasing accelerator opening degree. Thus, the reduction in the reaction force (arrow b in FIG. 9) and the stepwise increase in the accelerator-pedal reaction force (arrow c in FIG. 9) caused by the depression of the accelerator pedal by the driver may be repeatedly performed. Accordingly, as shown in FIG. 8, after the accelerator opening degree reaches the reaction-force-increasing accelerator opening degree, the accelerator opening degree fluctuates (in other words, the accelerator pedal unstably moves up and down) in a range centered on the reaction-force-increasing accelerator opening degree immediately after the accelerator opening degree reaches the reaction-force-increasing accelerator opening degree.

In contrast, according to the above-described embodiments of the present disclosure, the increase-elimination threshold is set to an accelerator opening degree that may be smaller than the reaction-force-increasing accelerator opening degree by a predetermined amount. Therefore, the above-described unstable movement of the accelerator pedal can be prevented.

Figure 10:
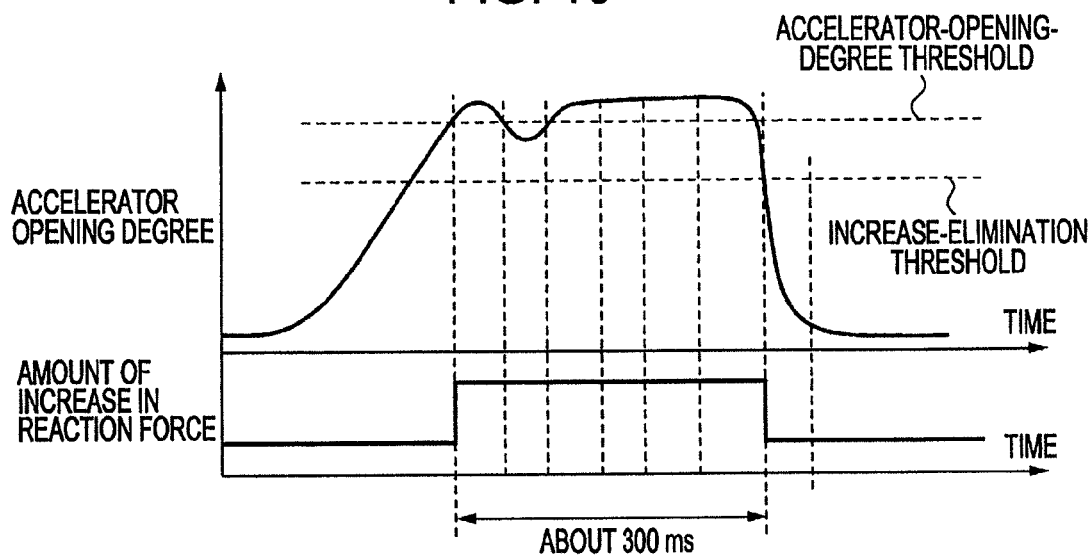
FIG. 10 is a timing chart showing the variation with time in the accelerator opening degree and the increase in the accelerator-pedal reaction force in the accelerator-pedal reaction force control apparatus in accordance with embodiments of the present disclosure.
Figure 11:
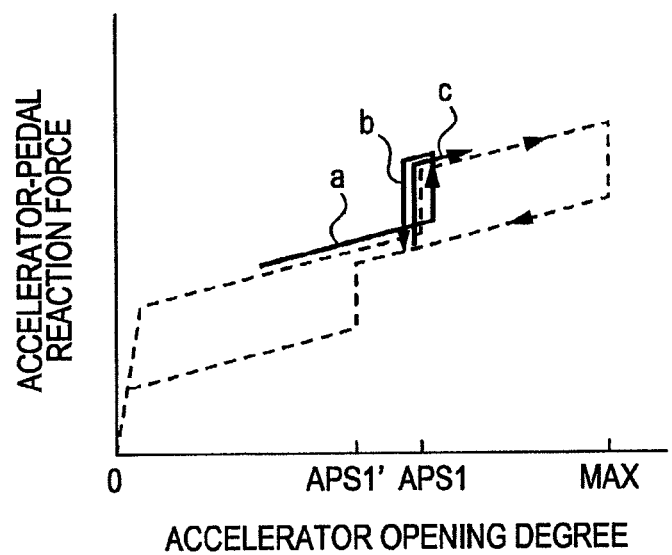
FIG. 11 is a characteristic diagram showing the variation in the accelerator-pedal reaction force according to the present disclosure using the accelerator opening degree and the accelerator-pedal reaction force as parameters.

FIG. 10 is a time chart illustrating the operation according to any one of the embodiments (for example, first exemplary embodiment) of the present disclosure, and FIG. 11 is a graph illustrating the operation by the arrows using the accelerator-pedal reaction force and the accelerator opening degree as parameters. In FIG. 11, the dashed lines show the characteristic of the accelerator-pedal reaction force with respect to the accelerator opening degree according to any one of the exemplary embodiments of the present disclosure.

When the driver depresses the accelerator pedal 2 and the accelerator opening degree exceeds the predetermined accelerator-opening-degree threshold (for example, APS1), the reaction force of the accelerator pedal 2 is largely increased from the basic reaction force (basic reaction force for the accelerator-opening-degree increasing direction), as described above (arrow a in FIG. 11).

When the accelerator-pedal reaction force is suddenly increased as described above, the accelerator pedal may be pushed back due to a rebound caused by the sudden increase in the accelerator-pedal reaction force. Therefore, the accelerator opening degree may become equal to or less than the accelerator-opening-degree threshold APS1. However, unless the accelerator opening degree is reduced to the increase-elimination threshold APS1', the amount of increase in the reaction force may be maintained. Therefore, the accelerator-pedal reaction force may be reduced (arrow b in FIG. 11) only by an amount corresponding to the hysteresis shown in FIG. 3 (amount corresponding to the difference between the basic reaction force for the increasing direction and that for the reducing direction) due to the change in the operating direction from the increasing direction to the reducing direction. Thus, the accelerator-pedal reaction force may be obtained as the sum of the basic reaction force for the reducing direction and the amount of increase in the reaction force.

Here, the original intention of the driver was to increase the accelerator opening degree, and the accelerator opening degree exceeded the accelerator-opening-degree threshold APS1 as a result of the operation of increasing the accelerator opening degree. Therefore, the driver may further depress the accelerator pedal 2 after the accelerator opening degree is reduced and becomes equal to or less than the accelerator-opening-degree threshold APS1. In such a case, the accelerator opening degree will exceed the accelerator-opening-degree threshold APS1 again. However, in this case, the amount of increase in the reaction force may already be added to the basic reaction force and no further addition will be performed. More specifically, the accelerator-pedal reaction force is increased (arrow c in FIG. 11) only by an amount corresponding to the hysteresis shown in FIG. 3 (amount corresponding to the difference between the basic reaction force for the reducing direction and that for the increasing direction) due to the change in the operating direction from the reducing direction to the increasing direction. As a result, the depressing force applied to the accelerator pedal 2 by the driver and the reaction force of the accelerator pedal 2 balance each other.

Therefore, as shown in FIG. 10, the unstable movement of the accelerator pedal 2 against the intention of the driver after the accelerator opening degree reaches the accelerator-opening-degree threshold APS1 may be prevented.

Then, if the accelerator opening degree is reduced and becomes equal to or less than the increase-elimination threshold APS1', the amount of increase in the reaction force may be eliminated and the reaction force may be immediately reduced to the basic reaction force.

The amounts of increase in the reaction force B, D, E, and H described in the above exemplary embodiments may always be constant or may be changed in accordance with various conditions.

For example, the amount of increase in the reaction force may be increased as the accelerator-opening-degree threshold set on the basis of the operational state increases. In such a case, accurate information may be presented to the user even when the initial basic reaction force is large.

In the case where the amount of increase in the reaction force is changed, the difference between the accelerator-opening-degree threshold and the increase-elimination threshold may be preferably increased along with the amount of increase in the reaction force. More specifically, as the amount of increase in the reaction force increases, the amount by which the accelerator pedal 2 is pushed back increases. Therefore, the difference between the accelerator-opening-degree threshold and the increase-elimination threshold may be increased, in other words, the increase-elimination threshold is set to a relatively small accelerator opening degree, so that the unstable movement of the accelerator pedal 2 against the intention of the driver may be reliably prevented.

In addition, the difference between the accelerator-opening-degree threshold and the increase-elimination threshold may be increased as the accelerator-opening-degree threshold decreases. As the accelerator-opening-degree threshold decreases, the stepwise increase in the reaction force may occur at a smaller accelerator opening degree (that is, at a smaller reaction force). Therefore, the influence of the amount of increase in the reaction force becomes larger, and the accelerator pedal 2 may easily be pushed back. Therefore, the difference between the accelerator-opening-degree threshold and the increase-elimination threshold may be increased, in other words, the increase-elimination threshold is set to a relatively small accelerator opening degree, so that the unstable movement of the accelerator pedal 2 against the intention of the driver may be reliably prevented.

Figure 12:
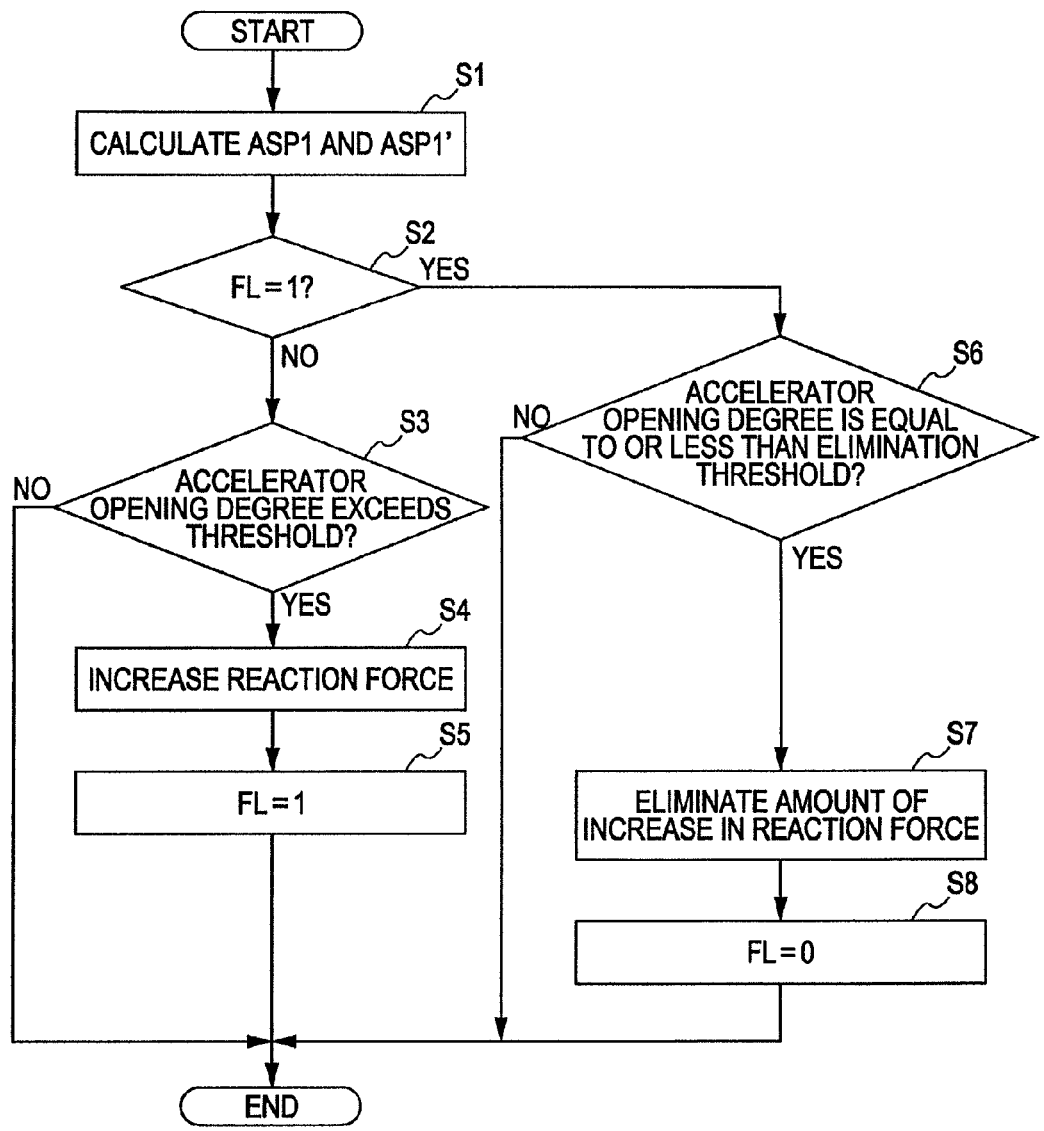
FIG. 12 is a flowchart of a control process performed by the accelerator-pedal reaction force control apparatus in accordance with embodiments of the present disclosure.

FIG. 12 is a flowchart of a process of controlling the accelerator-pedal reaction force according to the present disclosure. This process corresponds to the exemplary embodiment described with reference to FIGS. 4A and 4B in which the accelerator-opening-degree threshold is set in accordance with the state of engagement or disengagement of the lock-up clutch. Control processes for the other embodiments are basically similar to the control process shown in FIG. 12.

Figure 4B:
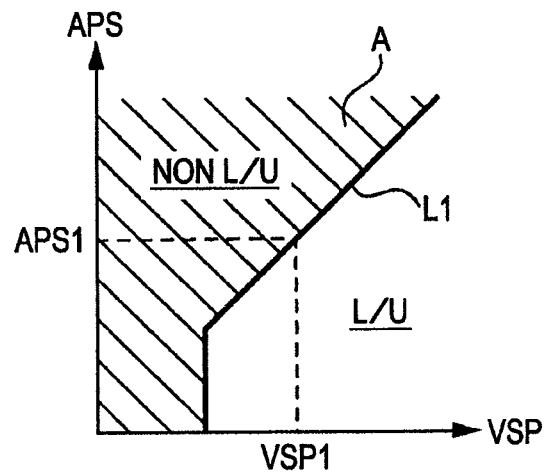

In step 1, the accelerator-opening-degree threshold APS1 corresponding to the current vehicle speed VSP may be determined by referring to the characteristic diagram shown in FIG. 4B. In addition, the increase-elimination threshold APS1' corresponding to the accelerator-opening-degree threshold APS1 may also be determined.

In step 2, the state of a flag FL showing whether or not the amount of increase in the reaction force is already added is checked. If the amount of increase in the reaction force is not yet added, that is, if the accelerator-pedal reaction force is equal to the basic reaction force, the process proceeds to step 3. If the amount of increase in the reaction force is already added, the process proceeds to step 6.

In step 3, provided that the direction in which the accelerator opening degree is changed is the increasing direction, it is determined whether or not the accelerator opening degree APS exceeds the accelerator-opening-degree threshold APS1. If the accelerator opening degree APS exceeds the accelerator-opening-degree threshold APS1, the process proceeds to step 4, where the amount of increase in the reaction force is added to the basic reaction force. Then, the above-described flag FL is set to 1 in step 5. If the result of the determination is NO in step 3, the routine is terminated.

In step 6, because the amount of increase in the reaction force is already added, it is determined whether or not the accelerator opening degree APS is equal to or less than the increase-elimination threshold APS1', provided that the direction in which the accelerator opening degree is changed is the reducing direction. If the result of the determination is NO, the routine is terminated. Thus, the addition of the amount of increase in the reaction force may be continued.

If the result of the determination is YES in step 6, the process proceeds to step 7, where the amount of increase in the reaction force added to the basic reaction force is eliminated. Then, the process proceeds to step 8, where the above-described flag FL is reset to 0.

In the above-described exemplary embodiments, the position of the accelerator pedal 2 itself (amount of depression) is detected as the accelerator opening degree. Therefore, in the above-described embodiment, the amount of depression of the accelerator pedal 2 may be substantially equivalent to the accelerator opening degree. However, the control operation according to the present disclosure may also be performed by using, for example, an opening degree of the throttle valve, which is operationally associated with the accelerator pedal 2, as the accelerator opening degree.

The vehicle in which the accelerator-pedal reaction force control apparatus according to the present disclosure may be used is not limited to a vehicle having an internal combustion engine as a drive source. For example, the accelerator-pedal reaction force control apparatus according to the present disclosure may also be used in an electric automobile or a hybrid automobile.

Accordingly, select embodiments of the present disclosure may provide an accelerator-pedal reaction force control apparatus including an accelerator-opening-degree detecting unit for detecting an accelerator opening degree which may change when an accelerator pedal of a vehicle is operated, a reaction-force changing unit for changing a reaction force of the accelerator pedal, and a controller to set an accelerator-opening-degree threshold associated with a specific fuel consumption on the basis of a driving state. A predetermined amount of increase may be added to the reaction force of the accelerator pedal when the accelerator opening degree exceeds the accelerator-opening-degree threshold. An increase-elimination threshold may be set to an accelerator opening degree that is smaller than the accelerator-opening-degree threshold by a predetermined amount, and the amount of increase in the reaction force of the accelerator pedal may be eliminated when the accelerator opening degree is reduced to the increase-elimination threshold.

Additionally according to select embodiments of the present disclosure, even when the accelerator pedal is pushed back due to the increase in the reaction force caused when the accelerator opening degree exceeds the accelerator-opening-degree threshold, the amount of increase in the reaction force may not be eliminated unless the accelerator opening degree is reduced to the increase-elimination threshold, which is smaller than the accelerator-opening-degree threshold. Therefore, the reaction force is not reduced and the unstable movement of the accelerator pedal against the intention of the driver may be reliably prevented.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An accelerator reaction force control apparatus for a vehicle comprising:
    a means for detecting a position of an accelerator;
    a means for changing a reaction force of the accelerator; and
    a controller configured to control the reaction force changing means,
    wherein;
        the controller sets a first position threshold of the accelerator associated with an operating state of the vehicle,
        the controller controls the reaction force changing means to add an increase to the reaction force of the accelerator when the accelerator position exceeds the first position threshold;
        the controller sets an second position threshold of the accelerator smaller than the first position threshold; and
    wherein the controller controls the reaction force changing means to eliminate the increase in the reaction force of the accelerator when the accelerator position is reduced to equal to or less than the second position threshold.

2. An accelerator apparatus comprising:
    an accelerator position sensor;
    a reaction force controller to adjust a reaction force of an accelerator;
    wherein the reaction force controller comprises;
        a first position threshold based on an operating state, and a second position threshold that is less than the first position threshold;
    wherein the reaction force controller is configured to increase the reaction force when the accelerator passes the first position threshold; and
    wherein the reaction force controller is configured to reduce the reaction force when the accelerator is reduced to a position below the second position threshold from a position above the first position threshold.

3. The apparatus of claim 1, wherein a difference between the first position threshold and the second position threshold is a function of an increase amount added to the reaction force.

4. The apparatus of claim 3, wherein the difference between the first position threshold and the second position threshold is increased as the increase amount is increased.

5. The apparatus of claim 3, wherein the difference is increased as the first position threshold decreases.

6. The apparatus of claim 1, wherein the reaction force increase increases as the first position threshold increases.

7. The apparatus of claim 1, wherein the operating state comprises a point at which a lock-up clutch engages or disengages.

8. The apparatus of claim 1, wherein the operating state comprises an engine load state.

9. The apparatus of claim 1, wherein the operating state comprises a fuel economy state.

10. The apparatus of claim 1, wherein the operating state comprises a transmission shift map.

11. The apparatus of claim 1, wherein the accelerator position comprises an accelerator-opening-degree.

12. A method to control a reaction force of an accelerator of a vehicle, the method comprising:
    detecting a position of the accelerator;
    setting a first position threshold of the accelerator based upon an operating state of the vehicle;
    setting a second position threshold of the accelerator below the first position threshold;
    increasing a reaction force of the accelerator when the accelerator position exceeds the first position threshold; and
    reducing the increased reaction force of the accelerator when the accelerator position is reduced from a position in excess of the first position threshold to a position equal to or less than the second position threshold.

13. The accelerator reaction force control apparatus of claim 12, further comprising changing a difference between the first position threshold and the second position threshold as a function of the increased reaction force.

14. The accelerator reaction force control apparatus of claim 13, further comprising increasing the difference as the reaction force is increased.

15. The accelerator reaction force control apparatus of claim 12, further comprising increasing the reaction force as the first position threshold is increased.

16. The accelerator reaction force control apparatus of claim 12, further comprising increasing a difference between the first position threshold and the second position threshold as the first position threshold is decreased.

17. The apparatus of claim 2, wherein a difference between the first position threshold and the second position threshold is a function of an increase amount added to the reaction force.

18. The apparatus of claim 17, wherein the difference between the first position threshold and the second position threshold is increased as the increase amount is increased.

19. The apparatus of claim 17, wherein the difference is increased as the first position threshold decreases.

20. The apparatus of claim 2, wherein the reaction force increase increases as the first position threshold increases.

21. The apparatus of claim 2, wherein the operating state comprises a point at which a lock-up clutch engages or disengages.

22. The apparatus of claim 2, wherein the operating state comprises an engine load state.

23. The apparatus of claim 2, wherein the operating state comprises a fuel economy state.

24. The apparatus of claim 2, wherein the operating state comprises a transmission shift map.

25. The apparatus of claim 2, wherein the accelerator position comprises an accelerator-opening-degree.

* * * * *

UNITED STATES PATENT AND TRADEMARK OFFICE
CERTIFICATE OF CORRECTION

| | |
|---|---|
| PATENT NO. | : 8,433,492 B2 |
| APPLICATION NO. | : 12/999413 |
| DATED | : April 30, 2013 |
| INVENTOR(S) | : Shiomi et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this
Thirtieth Day of December, 2014

Michelle K. Lee
*Deputy Director of the United States Patent and Trademark Office*